March 26, 1935. N. A. CARTER 1,995,375
VEHICLE WHEEL MOUNTING
Filed Dec. 10, 1931  5 Sheets-Sheet 1
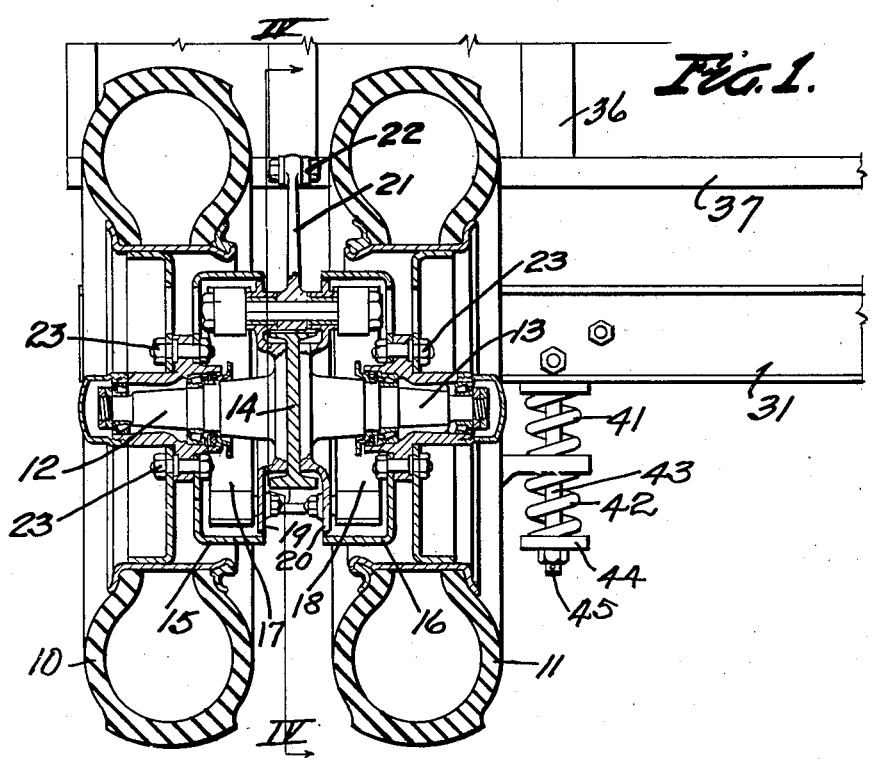
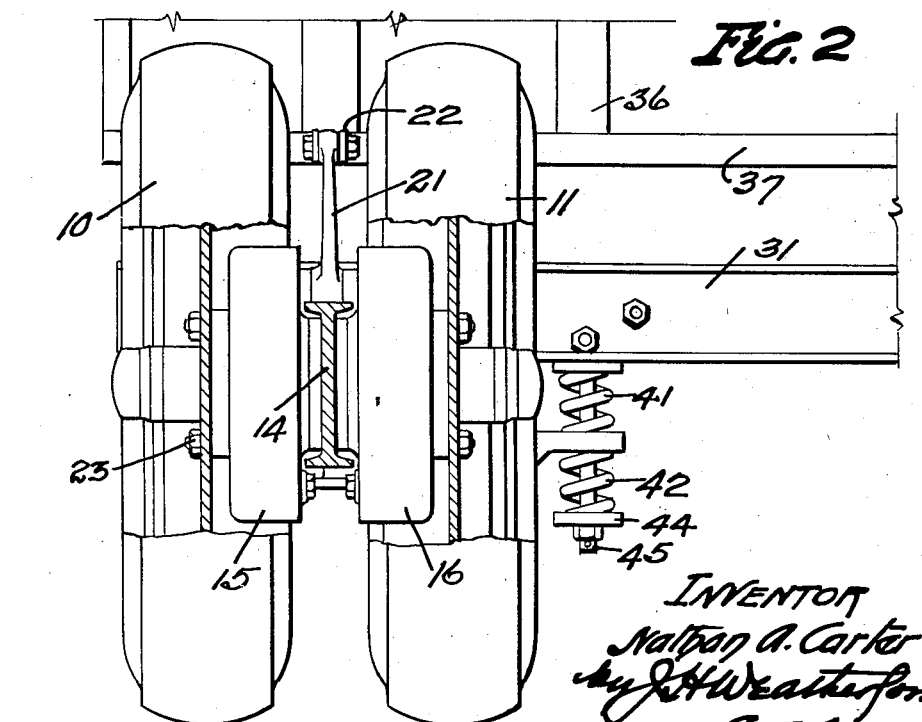

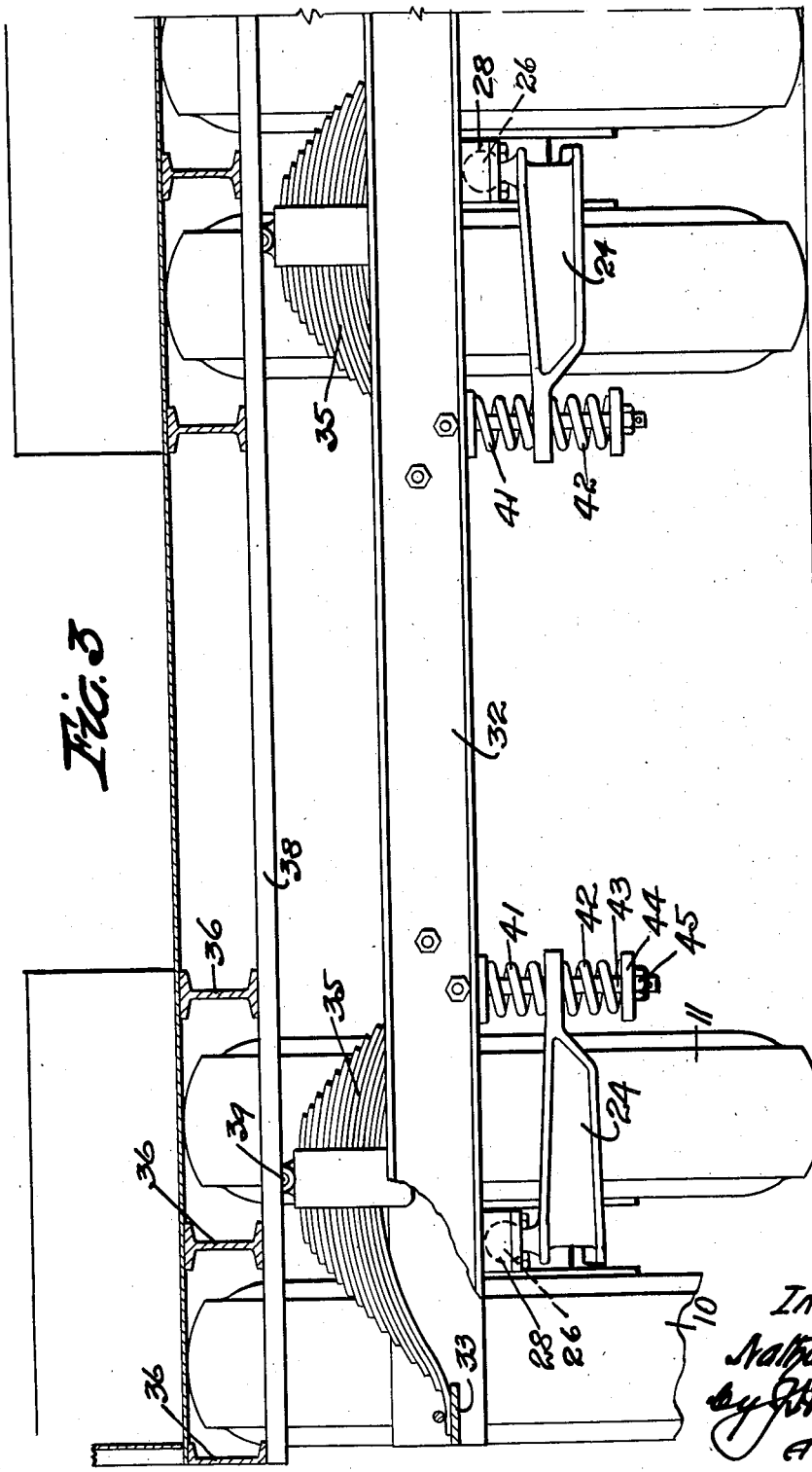

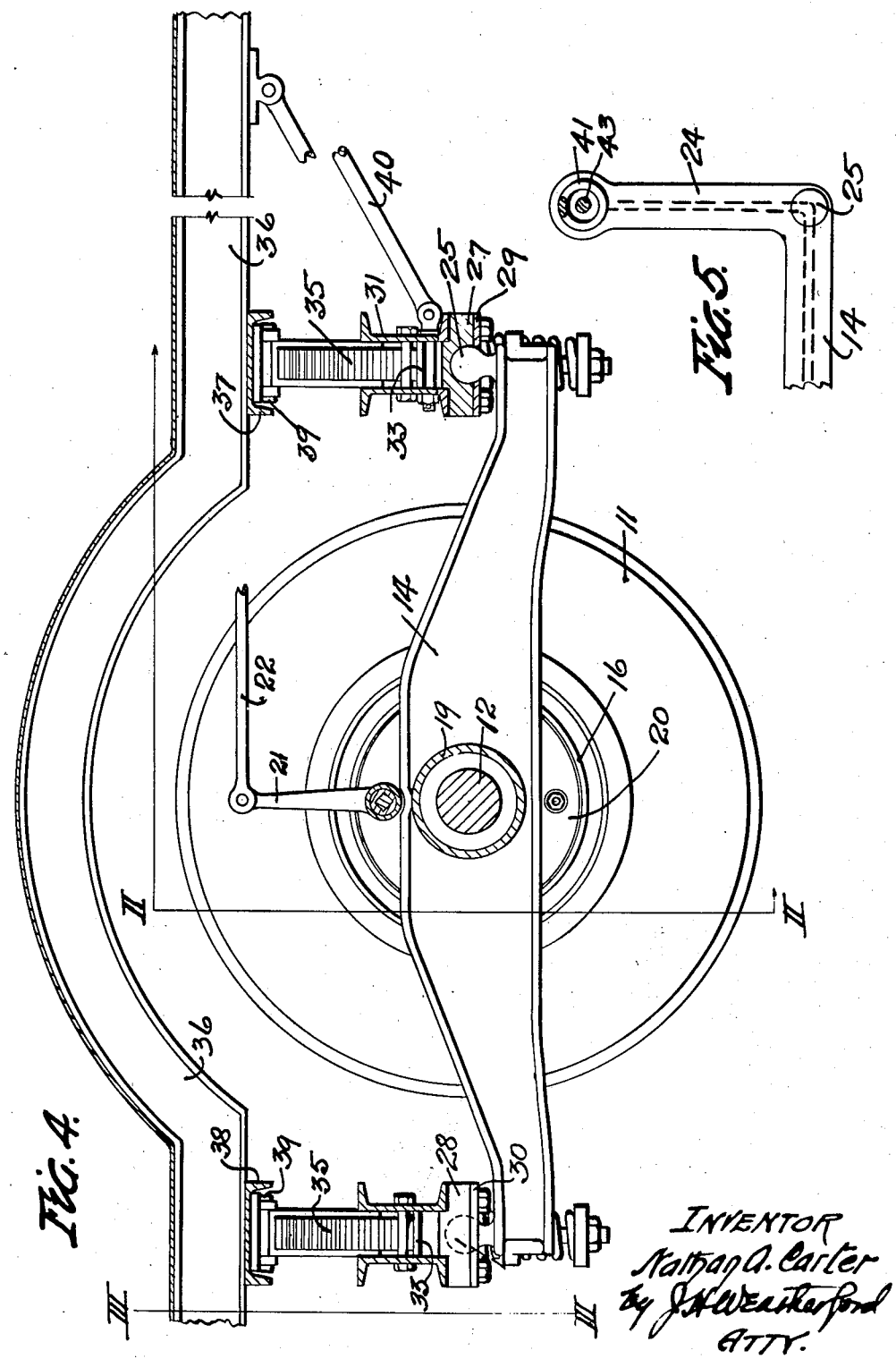

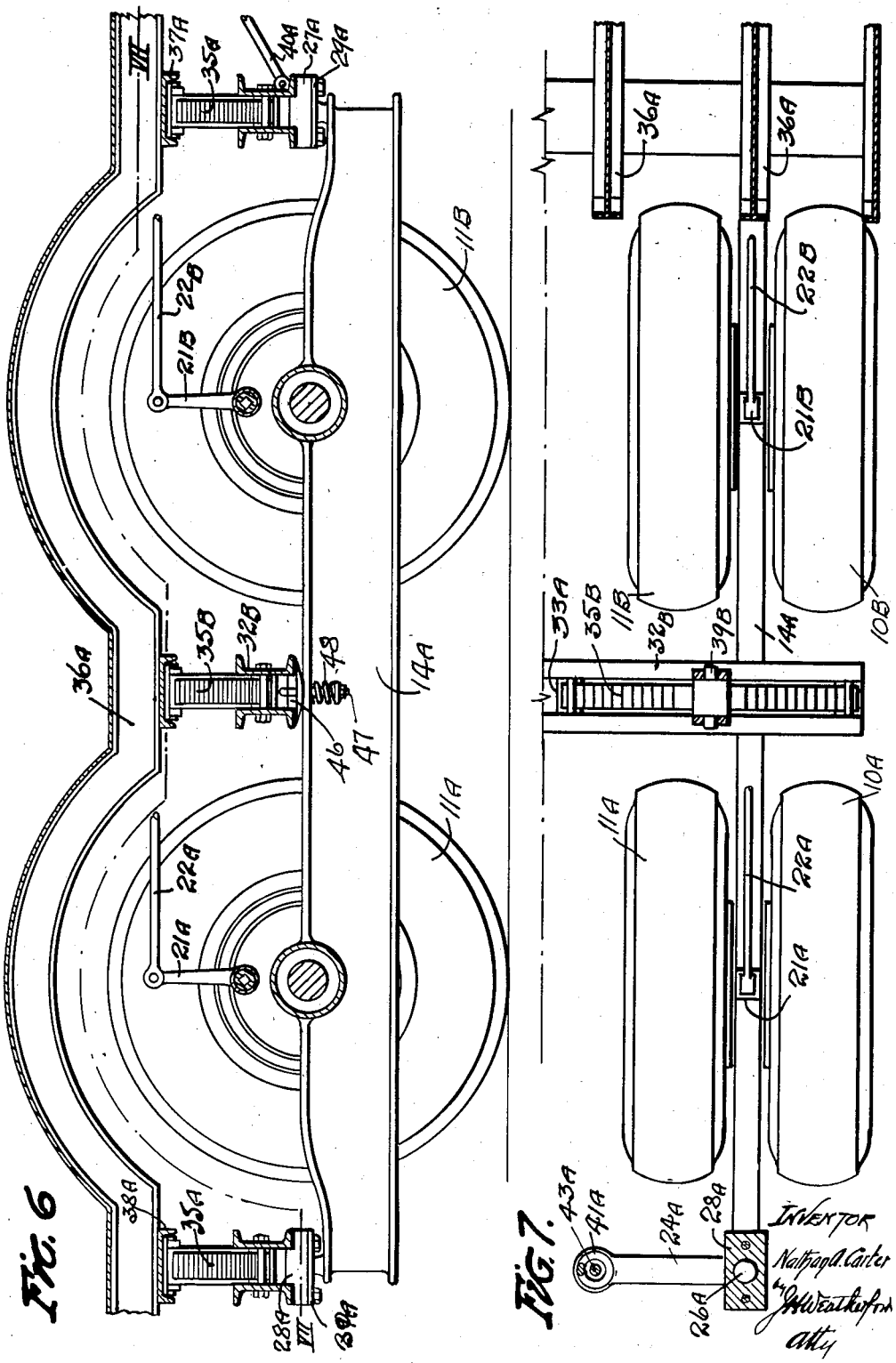

March 26, 1935.  N. A. CARTER  1,995,375
VEHICLE WHEEL MOUNTING
Filed Dec. 10, 1931  5 Sheets-Sheet 5
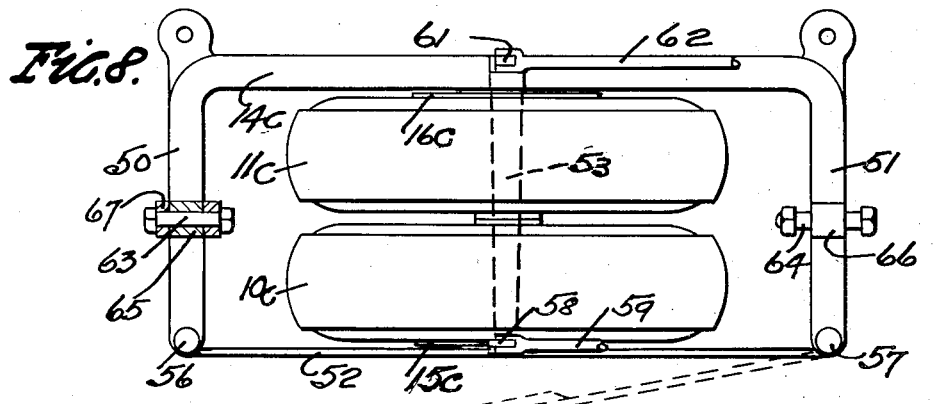
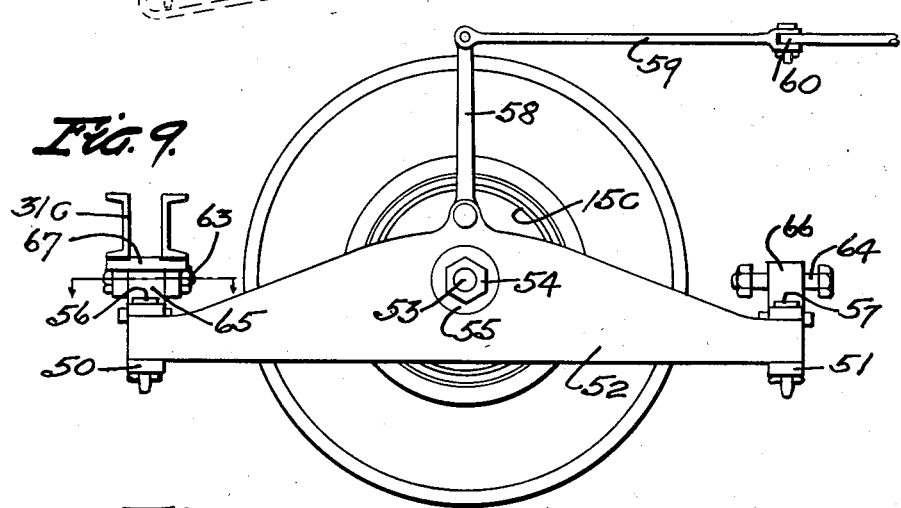
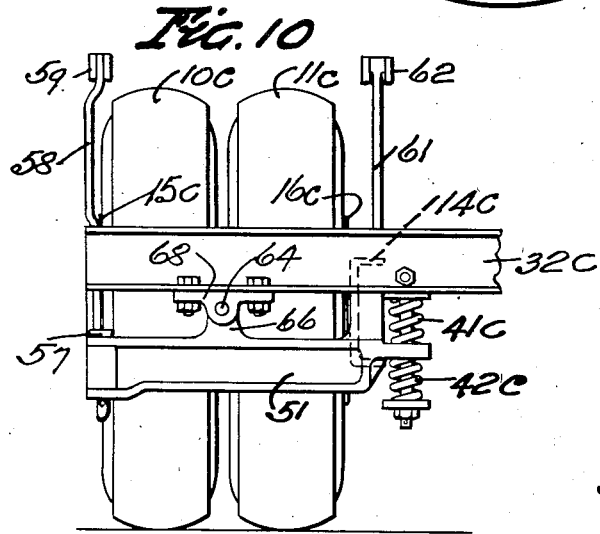
INVENTOR
Nathan A. Carter
By J. H. Weatherford
ATTY.

Patented Mar. 26, 1935

1,995,375

UNITED STATES PATENT OFFICE 1,995,375

VEHICLE WHEEL MOUNTING

Nathan A. Carter, Memphis, Tenn.

Application December 10, 1931, Serial No. 580,068

14 Claims. (Cl. 280—124)

This invention relates to improvements in wheel mountings for vehicles in which the load is carried by pairs of wheels on each side of the vehicle instead of by a single wheel on each side. It has long been customary to use dual tires or wheel mountings on trucks and buses to care for the heavy loads now being imposed on the wheel structures. Such dual tire or wheel mountings are extremely advantageous with pneumatic tires in that temporarily the loads may be carried by a single one of the wheels when a tire is punctured or blows out and for other reasons. They are however, open to the very serious disadvantage and excessive tire wear set up in passing around curves, where one or both of the tires must slip on the pavement to compensate for the difference in distances traveled, this being especially true in turning sharp corners on city streets. They are also open to very serious disadvantages that on well crowned roads or streets the inner wheel or tire must in many cases carry almost the entire load, thus effectually minimizing or even defeating the purpose for which they are used. The present invention seeks to compensate for and/or avoid these difficulties.

The objects of the present invention are:

To provide independent rotative motion for each of the wheels;

To provide means permitting the wheels of each pair to adjust themselves transversely to conform to variations in road crowns or the like;

To provide means for resiliently resisting transverse oscillation;

To provide means for limiting such oscillation;

To provide means for jointly applying brakes to an independently rotating pair of dual wheels; and Generally to improve the detail and construction of such a dual wheel mounting.

The means by which the foregoing and other objects are accomplished and the manner of their accomplishment will readily be understood from the following specification on reference to the accompanying drawings, in which:

Fig. 1 is a transverse sectional elevation taken as on the center line of a pair of dual wheels;

Fig. 2 is a transverse elevation partially in section on the line II—II of Fig. 4, showing the same wheels and mountings;

Fig. 3 is a transverse sectional elevation taken as on the line III—III of Fig. 4, showing the rear view of both dual wheel mountings for a vehicle;

Fig. 4, is a sectional side elevation taken as on the line IV—IV of Fig. 1;

Fig. 5 is a fragmentary plan of a portion of one of the wheel truck beams and its oscillation limiting arm;

Fig. 6 is a sectional elevation corresponding to Fig. 4, showing two dual wheels mounted in tandem;

Fig. 7 is a sectional plan view of the same structure taken as on the irregular line VII—VII of Fig. 6;

Fig. 8 is a plan view; Fig. 9, a side elevation; and Fig. 10 an end elevation of a modified form of truck frame.

Referring now to the drawings in which the various parts are indicated by numerals, 10, 11 are dual wheels which are rotatably mounted on an aligned pair of stub axles 12, 13 respectively, a well known form or roller bearings therefor being shown. The two stub axles are secured rigidly to the vertical web of a beam 14, they may of course be a single piece or may be separately made and secured in any usual or well known manner but preferably by welding. The wheels are preferably provided with brake drums 15, 16 respectively with which drums, brake shoes 17, 18 cooperate in usual manner. These brake shoes are preferably carried by discs 19, 20 which are carried by and may be integral with the flanges of the axles 12, 13 respectively. Both sets of brake shoes are controlled by a joint brake arm 21, which arm is actuated through a brake rod 22 (see Fig. 4) in usual manner. Preferably the disc or spider of each wheel is detachably secured to its hub as by bolts and nuts 23, so that the rim structure may be removed for tire changing.

The beam 14, as will be more clearly seen in Fig. 4, extends forwardly and rearwardly between the wheels and therebeyond and at one or both ends has secured an arm 24 which extends inward at right angles to the beam, these arms preferably being an integral part of the beam structure. At the forward end of the beam, is a ball 25 and at the rear end a ball 26, which are disposed in ball sockets 27, 28 respectively, being secured in such sockets by retaining plates 29, and 30.

The ball sockets 27, 28 respectively are carried by transverse members 31, 32, which members may be made up of channel iron, and which members extend transversely across from one side of the vehicle to an identical assembly on the opposite side, (Fig. 3). Forming part of the transverse members 31, 32 are spring seats 33, which support the opposite ends of springs 35. These springs are secured to the underside of the floor structure of the vehicle body, this structure being indicated as made up of longitudinal beams 36 and transverse channels 37, 38. The rear springs are pivotally connected to the channel 38 as by pins 39 and the forward springs similarly connected to the channels 37. The forward transverse member 31 is preferably additionally connected to the floor structure by radius rods 40.

Movement of the outer end of the arms 24 is restrained by a spring structure, which comprises in each case a spring 41, disposed between the upper side of the arm and the underside of the transverse member and a second spring 42 which is disposed below the arm 24. Passing through the end of the arm 24 and these springs is a bolt 43 the upper end of which is secured to the transverse member and the lower end of which is provided with a washer 44 and nut 45 by which the springs 41, 42 may be initially compressed to provide initial tension against the arm 24. This structure not only resiliently restrains movement of the arm but definitely also limits such movement.

In Figs. 6 and 7 substantially the same general structure is provided except that two sets of dual wheels 10A, 11A, and 10B, 11B are provided instead of one set. Parts on these views which are identical with parts in the preceding views have been given the suffix A, will not be again described. In this structure the beam 14A carries two sets of wheels, and is identically supported and controlled at the front and rear ends, but additionally it is preferably provided with an additional set of springs 35B which are secured to the floor structure and to a transverse member 32B. The member 32B however is preferably provided with a shoe 46 which rests on the top of the beam 14A and which shoe is secured to the beam by a U bolt 47. 48 is one of a pair of compression springs which allow rocking movement of the shoe 46 on the beam.

In Figs. 8, 9 and 10 a beam structure is substituted for the single beam 14, or 14A, of the preceding views. In this structure a principal beam 14C is disposed alongside the innermost one of the wheels 10C, 11C, such beam being necessarily off center of the wheel load. At the forward and rear ends of this beam transverse beams 50 and 51 extend outward, these transverse beams preferably being an integral part of the principal beam 14C. Bridging between the ends of these transverse beams 50, 51, is an outer beam 52 which preferably is a plate without flanges having depth sufficient to carry the load but depending for its transverse strength on its connection to the beam 14C.

Integral with or rigidly secured to the beam 14C is an axle 53, which projects through the outer beam or plate 52 and is rigidly secured thereto as by the nut 54. Preferably the beam 52 is cupped inward at 55 in order to form a recess to receive the nut 54 whereby it need not project beyond the face of the beam 52. The beam 52 is made thin and the nut housed therewithin in order to provide a minimum projection of the carrier parts beyond the outer wheel 10C. The beam 52 is connected to the beam 50 and to the beam 51 by locking pins 56, 57, one or both of which are readily removable whereby one pin, as the pin 56, and the nut 54 may be removed and the beam 52 be swung outward to permit access to and removal of the wheels 10C and 11C. Each of the wheels is independently journalled on the axle 53 so that as before the wheels roll independently. The wheel 10C is provided with a brake drum 15C and the wheel 11C with a brake drum 16C, which drums respectively face outward and inward. Cooperating with these drums are brake shoes and parts similar to those shown in Fig. 1. The brake parts for the drum 15C are mounted on and carried by the beam 52, and those for the drum 16C are mounted on and carried by the principal beam 14C. Actuating the brake shoes for the drum 15C is a brake lever 58 and brake rod 59, which rod is preferably provided with a hinge joint 60 above and in alignment with the pin 57. The brake shoes for the drum 16C are provided with a brake lever 61 and brake rod 62, which brake rod need not be jointed.

The beam structure may be universally connected with the transverse frame members 31C, 32C by ball and socket joints as before shown, or pins 63, 64 longitudinally disposed may be substituted for the ball structure. In such case bosses 65, 66, are extended upward from the front and rear frame members 50, 51, respectively, forked brackets 67, 68 are secured to the transverse members 31C, 32C and the bosses and brackets are pivotally connected by the pins 63, 64.

Transverse oscillation of the wheel carriers is resisted and limited by springs 41C, 42C as in the previous described figures.

Either this form of beam structure, or that previously shown serve as an elongated beam structure for supporting the dual wheels, and will be so designated in the claims.

In use the wheels 10 and 11 conform themselves to inequalities in the road surface by compression of the springs 41 and 42 depending on which of the wheels is on the higher portion of the surface, these springs also allow a limited amount of oscillation where one of the wheels drops into a hole or rides over an obstruction, but they prevent such wheel from dropping deeply into the hole or from freely overriding a large obstruction. In case one of the tires is punctured or blows out the upper or lower spring compresses fully depending on whether the outer or inner tire is flat and thereby the load is carried by the tire which stands up. In the case of the duplicate wheel structure the oscillating action to conform to the crown or other transverse inequalities is substantially identical. In this case however, the forward and rear pairs of wheels in succession may partially conform themselves longitudinally to inequalities in the road surface, such action being in addition to the transverse oscillating action of the original structure.

It will be particularly noted that each wheel is free to turn independently of any of the other wheels so that no tire wear is brought about in passing around curves or turning corners. It will be seen however, that the braking action is simultaneous and if properly adjusted is equal on both wheels of each pair.

Where the form of beam shown in Figs. 1 to 7 is used, to change a tire on the outer wheel, it is only necessary to directly remove the wheel as by removing the nuts 23 in usual manner. Where an inner wheel is to be removed the nuts retaining either the front ball socket cover plate 29 or rear cover plate 30, as may be desired, are removed the arms 24 are disconnected, and the entire beam structure swung outward around the other ball and socket and access thereby is had to remove the inner wheel in similar manner.

Where the form shown in Figs. 8 to 10 is used, the pin 56 and nut 54 are removed and the outer beam 52 together with attached brake parts are swung outward around the pin 57 and hinge member 60, and one or both wheels is removed.

It will be understood that the structures herein shown are intended to be typical only, that various modifications may be made, and that I do not intend to limit myself to the exact structure, and/or detail thereof, except as the same may specifically be set out in any claim, or claims.

Having described my invention, what I claim is:—

1. In a wheel mounting for a vehicle having a main frame, spring groups spaced apart longitudinally, secured to and depending below said main frame, transverse members, each supporting one group of said springs, a pair of beams disposed one adjacent each side of the main frame, said beams having their fore and aft ends respectively, beneath the corresponding transverse members, universal joints each connecting a beam end to a transverse member, arms each secured to a beam end and projecting laterally inward therefrom beneath a transverse member, compression springs for each of said arms, disposed respectively between the inward end of said arm and said member, and below said arm; and a bolt passing through said springs, said arm end, and said member, securing and compressing the lower spring against said arm end, aligned stub axles secured to and projecting respectively inward and outward from each of said beams and wheels each rotatably mounted on an axle.

2. In a wheel mounting for a vehicle having a main frame, spring groups spaced apart longitudinally, secured to and depending below said main frame, transverse members, each supporting one group of said springs, a pair of beams disposed one adjacent each side of the main frame, said beams having their fore and aft ends respectively, beneath the corresponding transverse members, balls one on each beam end, complementary ball sockets on said transverse members, arms each secured to a beam end and projecting laterally inward therefrom beneath a transverse member, a pair of compression springs for each of said arms, disposed respectively between the inward end of said arm and said member, and below said arm; and a bolt passing through said springs, said arm end, and said member, securing and compressing the lower spring against said arm end, aligned stub axles secured to and projecting respectively inward and outward from each of said beams, and wheels each rotatably mounted on an axle.

3. In a wheel mounting for a vehicle having a main frame, spring groups spaced apart longitudinally secured to and depending below said main frame, transverse members, each supporting one group of said springs, a pair of beams disposed one adjacent each side of the main frame said beams having their fore and aft ends respectively, beneath the corresponding transverse members, universal joints each connecting a beam end to a transverse member, arms each secured to a beam end and projecting laterally inward therefrom beneath a transverse member, means for resiliently resisting and for limiting movement of said arm end relative to said transverse member, aligned stub axles secured to and projecting respectively inward and outward from each of said beams, and wheels each rotatably mounted on an axle.

4. In a wheel mounting for a vehicle having a main frame, spring groups spaced apart longitudinally secured to and depending below said main frame, transverse members, each supporting one group of said springs, a pair of beams disposed one adjacent each side of the main frame, said beams having their fore and aft ends respectively, beneath the corresponding transverse members, pivotal joints each connecting a beam end to a transverse member, arms each secured to a beam end and projecting laterally inward therefrom beneath its said transverse member, means limiting relative movement of each arm end and its related transverse member, aligned stub axles secured to and projecting respectively inward and outward from each of said beams, and wheels each rotatably mounted on an axle.

5. In a dual-wheel mounting for a vehicle, a beam extending longitudinally beneath said vehicle and adjacent a side thereof, means universally connecting the ends of said beam to said vehicle, means for limiting oscillation of said beam about its longitudinal axis, axially aligned stub axles integral with said beam, projecting inward and outward respectively therefrom and at right angles thereto, and a pair of wheels, rotatably mounted, one on each of said axles.

6. In a wheel mounting for vehicles, a pair of beams disposed one adjacent and beneath each side of the vehicle body, said beams each having its ends oscillatably connected to said body, means for resiliently resisting oscillation of each of said beams about its longitudinal axis, means for limiting such oscillation, aligned stub axles projecting respectively inward and outward from said beams, and wheels rotatably mounted, one on each of said stub axles.

7. In a wheel mounting for vehicles, a pair of beams disposed one adjacent and beneath each side of the vehicle body, said beams each having its ends oscillatably connected to said body, a member secured to said beam, extending laterally inward therefrom, and cooperating with said body, to limit oscillation of each of said beams about its longitudinal axis, aligned stub axles projecting respectively inward and outward from said beams, and wheels rotatably mounted, one on each of said stub axles.

8. In a dual-wheel mounting for a vehicle, a beam extending longitudinally beneath said vehicle and adjacent a side thereof, means oscillatably connecting the ends of said beam to said vehicle, means for resiliently resisting oscillation of said beam about its longitudinal axis, means for limiting such oscillation, one or more pairs of axially aligned stub axles rigidly secured to and projecting respectively inward and outward at right angles to said beam, and wheels rotatably mounted one on each of said axles.

9. In a dual-wheel mounting for a vehicle, a beam extending longitudinally beneath said vehicle and adjacent a side thereof, means oscillatably connecting the ends of said beam to said vehicle, means secured to said beam, extending laterally therefrom and cooperating with said vehicle, to limit oscillation of said beam about its longitudinal axis, one or more pairs of axially aligned stub axles rigidly secured to and projecting respectively inward and outward at right angles to said beam and wheels rotatably mounted one on each of said axles.

10. In a vehicle wheel mounting, a beam having its web vertically disposed, axles secured to and projecting laterally from said web in opposite directions, wheels, rotatably mounted, one on each axle end, means respectively, oscillatably connecting the forward and the rear ends of said beam to said vehicle, and means for resiliently restraining oscillation of said beam about its longitudinal axis.

11. In a vehicle wheel mounting, a beam having its web vertically disposed, axles secured to and projecting laterally from said web in opposite directions, wheels, rotatably mounted, one on each axle end, means respectively, hingedly connecting the forward and the rear ends of said beam to said vehicle, means for resiliently resisting oscillation of said beam about its longitudinal axis.

12. In a vehicle wheel mounting a beam having its web vertically disposed, axles secured to and projecting laterally from said web in equal and opposite directions, wheels, rotatably mounted, one on each axle end, whereby said beam is laterally equally supported, means respectively, oscillatably connecting the forward and the rear ends of said beam to said vehicle, means for resiliently restraining oscillation of said beam about its longitudinal axis, and means for limiting such oscillation.

13. In a vehicle wheel mounting, a beam having its web vertically disposed, axles secured to and projecting laterally from said web in equal and opposite directions, wheels, rotatably mounted, one on each axle end, whereby said beam is laterally equally supported, means respectively, oscillatably connecting the forward and the rear ends of said beam to said vehicle, and an arm integral with said beam extending laterally therefrom, and cooperating with said vehicle to limit oscillation of said beam about its longitudinal axis.

14. In a wheel mounting for a vehicle, an elongated wheel carrier, an axle member disposed transversely to said carrier and secured thereto, a pair of wheels mounted for independent rotation on said axle member, spring structures secured to and depending below said vehicle adjacent the forward and rear ends respectively of said carrier, means oscillatably securing the forward, and means oscillatably securing the rear, ends of said carrier, to their respectively related spring structures, means for resiliently restraining oscillation of said carrier about its longitudinal axis and means for limiting such action.

NATHAN A. CARTER.